United States Patent Office 3,538,159
Patented Nov. 3, 1970

3,538,159
PROCESS FOR PREPARING DI-N-METHYLAMIDES FROM DIMETHYLAMINES
Louis Lloyd Duffy, Norton-on-Tees, England, assignor to Imperial Chemical Industries Limited, London, England, a corporation of Great Britain
No Drawing. Filed Feb. 12, 1968, Ser. No. 704,523
Claims priority, application Great Britain, Feb. 21, 1967, 8,262/67
Int. Cl. C07c 103/34
U.S. Cl. 260—561      10 Claims

ABSTRACT OF THE DISCLOSURE

A process in which di-N-methylamides are produced by reacting dimethylamine with an ester of formula RCOOR' in which R and R' are alkyl groups in a medium which comprises as a catalyst a strongly alkaline compound of an alkali metal and distilling the product to recover the di-N-methylamide in the presence of the hydroxide of the alkali metal.

---

This invention relates to the production of di-N-alkylamides.

Di-N-alkylamides may be produced by reacting a dialkylamine with an ester in the presence of, for example, an alkali metal alcoholate. In such a process it is desirable to purify the product by distillation, but if the catalyst is present during the distillation it is in general found that at least some of the product is decomposed. This difficulty can, of course, be overcome by removing the catalyst before distillation.

We have however, found that alkali metal hydroxides cause little breakdown of the product during distillation. Thus, if sufficient water is added before distillation to convert the catalyst to its hydroxide, it is unnecessary to remove the catalyst before the distillation. We have also found that, in the presence of ethylene glycol, propylene glycol or propane 1,3-diol, the alkali metal hydroxides act as catalysts in the reaction, and in this case, water need not be added before the distillation because the catalyst is already in the hydroxide form.

The invention therefore provides a process in which di-N-methylamides are produced by reacting a dimethylamine with an ester of formula RCOOR' in which R and R' are alkyl groups, in a medium which comprises as a catalyst a strongly alkaline alkali metal compound; converting if necessary the alkali metal compound to the hydroxide by adding water and distilling the product in the presence of the alkali metal hydroxide to recover the di-N-methylamide.

The reaction is preferably carried out in the presence of ethylene glycol, propylene glycol or propane 1,3-diol; these materials render the reaction practicable in the presence of water in a concentration of up to 5%. A concentration of for example 5% to 50% by weight of the reaction medium of ethylene glycol, propylene glycol or propane 1,3-diol may be provided; preferably from 10% to 30% by weight is provided. It is found that in the presence of such quantities of ethylene glycol, propylene glycol or propane 1,3-diol, precipitation of alkali metal compounds during the distillation step is suppressed and this facilitates operation of the still column.

In the absence of ethylene glycol, propylene glycol and propane 1,3-diol it is in general necessary to use as the catalyst an alkali metal alcoholate or amide and to ensure that the reaction medium is substantially water free.

If the reaction is carried out in the presence of ethylene glycol, propylene glycol or propane 1,3-diol and the alkali metal compound is the alkali metal hydroxide it is unnecessary to add water before distilling the product; this will also apply if the alkali metal is supplied in the form of for example an alkoxide and sufficient water is present during the reaction to convert the alkoxide to the hydroxide.

The group R preferably has from 1 to 3 carbon atoms and the group R' preferably has from 1 to 4 carbon atoms.

Examples of alkali metal compounds which may be used include sodium methoxide, sodium ethoxide, potassium ethoxide, sodium or lithium propoxide and sodamide; for reasons of cost it is preferred when ethylene glycol, propylene glycol or propane 1,3-diol are present to use as the catalyst sodium hydroxide though, for example, the sodium and potassium ethylene and propylene glycollates and propane 1,3-diolates may be used. It is preferred that the alkali metal compound should be a sodium or potassium compound, sodium compounds being especially preferred.

In the course of the reaction an alcohol is formed as a byproduct; it is very desirable that the water should be present before the alcohol is removed by distillation but it may be added during the distillation whilst alcohol is still present. If water is not added until after the removal of the alcohol some degree of decomposition of the product to the alkali metal carboxylate and the dialkylamine occurs.

If ethylene glycol, propylene glycol or propane 1,3-diol are employed, these materials are left as heavy residues in the distillation and are contaminated with alkali metal compounds; it is preferred that before re-using the residue in a new reaction step that the residue should be passed through a bed of an ion exchange resin in its acid form so as to remove the alkali metal present. This procedure may result in the formation of esters of the ethylene glycol, propylene glycol or propane 1,3-diol but these are readily tolerated in the reaction.

Suitably between 0.005 and 0.1 and preferably between 0.01 and 0.03 gram atoms, of alkali metal are present per mole of ester fed.

The amine may suitably be provided in stoichiometric quantities, though either reactant may be used in an excess of for example 200%. In general it is preferred to use an excess of ester.

The reaction step of this invention is normally carried out at a temperature in the range of 5° and preferably 15° to 130° C. and more preferably in the range of 20° to 80° C. If one of the reactants is contaminated with an aldehyde, for example acetaldehyde, the reaction temperature should not exceed 25° C. Below this temperature very satisfactory yields may be obtained with concentrations of up to 1% by weight of aldehyde based on the ester. It is preferred to carry out the reaction under atmospheric pressure or at an elevated pressure of at most 200 atmospheres; preferably a pressure in the range of 1 to 50 atmospheres is employed.

A feature of the invention is that the ester may be used in admixture with alcohols, for example, the commercially available azeotrope of methyl acetate and methanol may be used.

EXAMPLE 1

An azeotropic mixture of 80% by weight of methyl acetate and 20% by weight of methanol was fed at a rate of 104 ml./hr. (1 mole of $CH_3COOCH_3$/hour) into a vessel containing a catalyst solution consisting of 6 g. of NaOH dissolved in 90 ml. of ethylene glycol. Further catalyst solution was fed in at a rate of 15 ml./hr., and dimethylamine was fed in at a rate of 0.5 mole/hr.

After about 4 hours, 400 g. of the azeotrope and 92.4 g. of dimethylamine had been fed. The contents of the vessel were then distilled. An azeotrope fraction of 219.7 g. (containing 1.5% by weight of dimethylamine) was recovered and the residue was distilled at a pressure of 50 mm. of mercury to give a fraction of 162.5 g. of dimethyl acetamide. A further 4.9 g. of dimethyl acetamide was present in the hold-up and residue representing a yield of 97.3% based on the dimethylamine consumed and a 96.4% conversion of the dimethylamine.

EXAMPLE 2

Example 1 was repeated using a commercial azeotrope of the following composition:

|  | Percent |
|---|---|
| Methyl acetate | 80.0 |
| Methanol | 17.3 |
| Dimethyl acetal | 2.2 |
| Acetic acid | <0.05 |
| Vinyl acetate | <0.1 |
| Acetaldehyde | <0.1 |
| Water | 0.5 |

139 g. of dimethylacetamide were produced representing a yield of 98.6% based on the dimethylamine consumed at an 80.8% conversion of the dimethylamine.

EXAMPLE 3

Example 1 was repeated except that water was added to the azeotrope, giving a composition:

|  | Percent by weight |
|---|---|
| $CH_3COOCH_3$ | 76.5 |
| $CH_3OH$ | 19.1 |
| $H_2O$ | 4.4 |

This azeotrope was fed at a rate of 108 ml./hr.

55 g. of dimethylacetamide were produced, giving a yield of 93.2% based on the dimethylamine consumed at a 32.6% conversion of dimethylamine.

EXAMPLE 4

104 ml./hr. of a mixture of methyl acetate (80% by weight) and methanol (20% by weight), 30 ml./hr. of a 5% solution of disodium ethylene glycollate in ethylene glycol, and 12 litres/hr. of dimethylamine (at ambient temperature and atmospheric pressure) were passed into a flask which was cooled to keep the temperature below 25° C.

After 4 hours the addition was stopped and 0.5% by weight of water (based on the methyl acetate/methanol mixture) was added to deactivate the catalyst. The product was then distilled and 166.7 g. of dimethyl acetamide was recovered, representing a 99.2% yield at 97.4% conversion of the dimethylamine.

EXAMPLE 5

65 g. of methyl propionate, 64 g. of liquid anhydrous dimethylamine were mixed and a solution of 1 g. of sodium hydroxide in 15 ml. of ethylene glycol added. The mixture was then allowed to stand for 1 hour at room temperature and atmospheric pressure. It was then distilled at atmospheric pressure and finally at a pressure of 50 mm. of mercury. 36.8 g. of dimethyl propionamide was recovered, representing a yield of 96.0% based on the ester consumed, at 51.4% conversion of the ester, and a 100% yield based on the amine consumed.

I claim:
1. A process in which di-N-methylamides are produced by reacting dimethylamine with an ester of formula RCOOR' in which R is an alkyl group having from 1 to 3 carbon atoms and R' is an alkyl group having from 1 to 4 carbon atoms at a temperature in the range 15° to 130° C. and at a pressure in the range 1 to 200 atmospheres in a substantially anhydrous medium which comprises as a catalyst an alkali metal alcoholate, amide, or hydroxide and distilling the product to recover the di-N-methylamide in the presence of the hydroxide of the alkali metal.

2. A process as claimed in claim 1 in which the alkali metal is sodium.

3. A process as claimed in claim 1 whenever carried out in the presence of ethylene glycol, propylene glycol or propane 1,3-diol.

4. A process as claimed in claim 3 in which a concentration of from 10 to 30% by weight of the reaction medium of ethylene glycol, propylene glycol or propane 1,3-diol is present.

5. A process as claimed in claim 3 in which the catalyst is an alkali metal hydroxide.

6. A process as claimed in claim 5 in which the ethylene glycol, propylene glycol or propane 1, 3-diol is recovered after the reaction as a distillation residue, is passed through a bed of an ion exchange resin in its acid form to remove the catalyst present, and is subsequently re-used in the reaction.

7. A process as claimed in claim 1 in which from 0.005 to 1 gram atoms of alkali metal are present per mole of ester fed.

8. A process as claimed in claim 1 in which an excess of ester is used.

9. A process as claimed in claim 1 in which an aldehyde is present and the reaction temperature does not exceed 25° C.

10. A process as claimed in claim 1 in which the ester is methyl acetate and is supplied as its azeotrope with methanol.

References Cited

UNITED STATES PATENTS

| 2,464,094 | 3/1949 | Meade | 260—404 |
| 2,844,609 | 7/1958 | Tesoro | 260—404 |
| 3,417,114 | 12/1968 | Kuceski | 260—404 |

ALEX MAZEL, Primary Examiner

R. V. RUSH, Assistant Examiner

U.S. Cl. X.R.
260—404